April 26, 1932.    S. M. TAYLOR    1,856,034
SAW TOOTH SWAGE SHAPER
Filed March 7, 1931    2 Sheets-Sheet 2
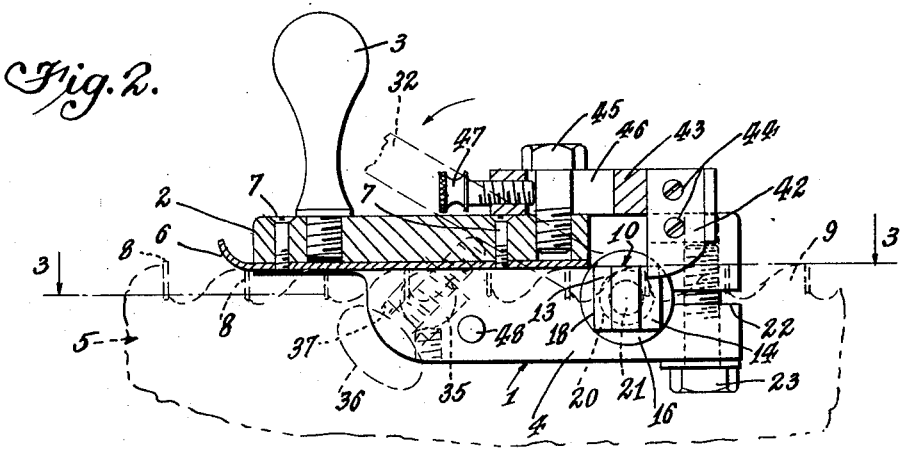
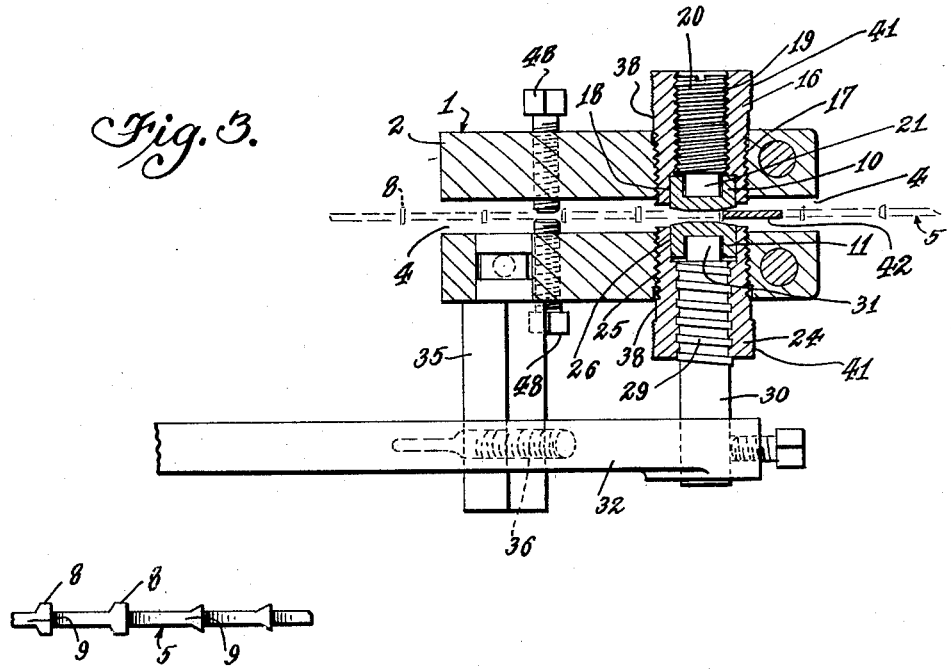
Inventor
Samuel M. Taylor
By Lyon & Lyon
Attorneys Patented Apr. 26, 1932

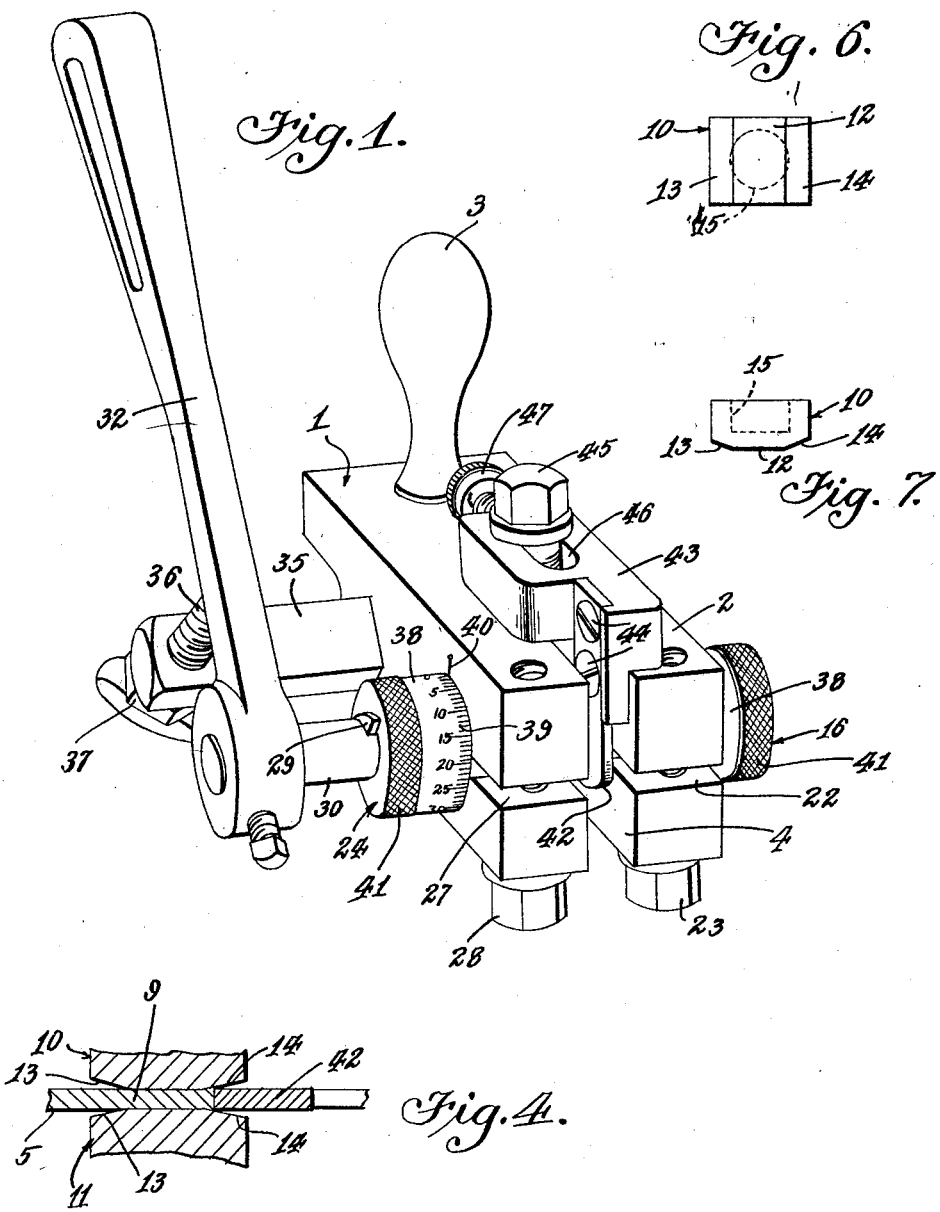

1,856,034

UNITED STATES PATENT OFFICE

SAMUEL M. TAYLOR, OF LOYALTON, CALIFORNIA

SAW TOOTH SWAGE SHAPER

Application filed March 7, 1931. Serial No. 520,321.

This invention relates to a saw tooth swage shaper for shaping the swaged portions of the ripping or planer teeth of a saw blade, such as set forth in my copending application, Serial No. 505,745, filed December 31, 1930, to give such ripping or planer teeth the necessary undercut or back clearance, and also to shape each tooth the same width so that each tooth will perform its portion of the work.

It is, therefore, the principal object of this invention to provide a shaper which will accurately shape and size the ripping and planer teeth of the saw blade disclosed in my copending application, above referred to.

It will be appreciated that when the planer teeth of the saw blade above referred to have been upset or swaged by the swaging tool, as set forth in my said copending application, Serial No. 520,822, filed March 7, 1931, that the upset or swaged edges of the planer teeth may not all be of exactly the same width or size nor will they have the necessary back clearance or undercut. It is, therefore, a further object of this invention to provide a saw tooth swage shaper which will accurately shape and size the upset or swaged portions of the planer teeth to give the necessary back clearance or undercut thereto, and also to size each tooth to exactly the same width so that each tooth will perform its allotted portion of the planing operation.

It is a further object of this invention to provide a saw tooth swage shaper which will shape and size in one operation the full depth of the swage of the planer tooth of the saw blade of my copending application, above referred to.

It is a further object of this invention to provide a shaping tooth which may be utilized to shape and size the ripping edge of the cutting teeth of a band or circular saw. The ripping edges of the cutting teeth are shaped to provide a back clearance or, as commonly called, undercut. When ripping a hard wood the undercut is long and of a gradual taper to provide the greatest amount of backing to strengthen or reinforce the cutting edge as the hardness of the wood has a tendency to break off or wear away the sharp edges of the teeth, while, when ripping soft wood, the undercut is short and of a relatively steep taper to prevent the saw from woodbinding and overheating which is due to the fibers of the soft wood closing upon the saw.

It is a further object of this invention to provide a swage shaper for the ripping edges of the cutting teeth which is adjustable to shape a long undercut for cutting hard wood or a short under cut for cutting soft wood.

It is a further object of this invention to provide a saw tooth swage shaper adjustable to shape the ripping edge of the cutting teeth to any desired undercut.

It is a further object of this invention to provide a saw tooth swage shaper with shaping dies adjustable to coincide with the angle of the swaged tooth to be shaped.

It is a further object of this invention to provide a saw tooth swage shaper with an adjustable tooth stop means for predetermining the position of the tooth with relation to the shaping dies, whereby each tooth is shaped to exactly the same size or width.

It is a further object of this invention to provide a saw tooth swage shaper with an adjustable means for predetermining or limiting the amount of action of the shaping dies.

It is a further object of this invention to provide a saw tooth shaper with shaping dies which will straighten any bent teeth.

It is a further object of this invention to provide a saw tooth shaper with shaping dies each of which is provided at opposite sides with beveled shaping edges so that when one of said edges becomes worn the die may be changed so that the second beveled shaping edge is used, and also to provide shaping dies which are relatively inexpensive and easily replaced.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification, and that variation therefrom in details of construction or arrangement of parts may accordingly be effected and yet remain within the spirit and scope of the invention as the same is set forth in the appended claims.

In the drawings:

Figure 1 is a perspective view of the invention;

Figure 2 is a longitudinal sectional view;

Figure 3 is a sectional view, taken substantially along line 3—3 of Fig. 2, and looking in the direction of the arrows;

Figure 4 is an enlarged fragmental sectional view of the shaper dies shaping and sizing the planer tooth and also illustrating the tooth stop holding the tooth in correct position;

Figure 5 illustrates a top fragmentary view of the planer teeth illustrating the condition of the teeth before and after shaping;

Figure 6 illustrates an enlarged plan view of one of the shaping dies; and

Figure 7 illustrates an enlarged end view of the shaping die of Fig. 6.

In the drawings, the shaping tool 1 includes a suitable block 2 having for ease of operation a handle 3, secured adjacent the rear end thereof. A slot 4, of greater width than saw blade 5, extends longitudinally through the center of block 2, thus permitting the tool to partially straddle the saw blade 5, as is clearly illustrated in Figure 2. To prevent the block at the upper edge of slot 4 from becoming worn as it is slid along the saw teeth, a wearing plate 6 may be mounted therein and secured to the block by suitable screws 7.

The upset or swaged portion 8 of the planer teeth 9 of the saw blade 5 is pressed between two shaping dies which are identical in construction, and interchangeable, but for convenience one die, which is stationary, will be designated 10 while the other, the movable die, will be designated 11. Each of the two shaping dies is substantially a rectangular block in shape, as illustrated in Figs. 6 and 7. The front face 12 of each die block is provided with beveled shaping edges 13 and 14, while the rear face is provided with a bore 15.

Each of the shaping dies 10 and 11 is separately mounted in block 2, so that the beveled shaping edges of one die block are opposed to the beveled shaping edges of the other die block. The mounting of the shaping dies in block 2 is such as to enable the adjustment of the opposed beveled shaping edges of the dies to any desired angular adjustment in a vertical plane.

The stationary shaping die block 10 may be mounted in the block 2 by any suitable means. In the present instance, a hollow angle adjusting sleeve 16 is screw threaded into block 2 as at 17 and is provided at its inner end with a rectangular slot 18 of sufficient width to permit die 10 to be placed therein and by this arrangement it will be appreciated that if the angle adjusting sleeve 16 is rotated that die 10 will be rotated therewith.

To provide for adjustment of die 10 toward or from the saw blade 5, sleeve 16 is provided with a threaded bore 19 through which is screw threaded the die adjusting screw 20 which is provided at the inner end thereof with a section of reduced diameter 21 loosely extending into bore 15 of the die block 10. It is also a function of section 21 of the adjusting screw to prevent die block 10 from sliding out of slot 18 after the die, adjusting sleeve and adjusting screw have been assembled in block 2, as the length of section 21 fitting into bore 15 of the die block is greater than the possible outward movement of the die block. To clamp sleeve 16, and thereby the die block 10, at any desired angular adjustment, block 2 is slotted, as at 22, from the threaded bore 17 to the adjacent end thereof, as is clearly illustrated in Figs. 1 and 2, and a clamping screw 23 is provided to clamp the end portion of block 2 to thereby clamp the threaded bore 17 upon sleeve 16 in the usual well known manner.

The movable shaping die block 11 may be mounted in the block 2 in any suitable manner, whereby die 11 may be actuated with sufficient force to properly shape the swaged portion 8 of the saw blade. In the present instance a hollow angle adjusting sleeve 24 is screw threaded into block 2, as at 25, in line with and directly opposite to sleeve 16, and like sleeve 16, sleeve 24 is provided with a rectangular slot 26 of sufficient width to receive die block 11 and by this arrangement it will be seen that when the angle adjusting sleeve 24 is rotated that die block 11 will be rotated therewith.

To clamp sleeve 24, and thereby die block 11, at any desired angular adjustment, block 2 is slotted, as at 27 from the threaded bore 25 to the adjacent end thereof and a clamping screw 28 is provided to clamp the end portion of block 2 to thereby clamp the threaded bore 25 in the usual and well known manner.

To actuate the movable shaping die block 11, a left hand course or quick-acting thread 29 is formed in the bore of sleeve 24 and screw threaded therethrough and having a corresponding course quick acting screw thread as the actuating screw 30. The inner end of screw 30 is provided with a section of reduced diameter 31 adapted to project into bore 15 of die block 11 to prevent the die block from sliding out of the rectangular slot 26 of sleeve 24 after the die, adjusting sleeve and adjusting screw have been assembled in block 2, as the length of section 31 fitting into bore 15 of the die block is greater than the possible outward movement of the die block. To the opposite end of the actuating screw 30 is suitably secured an operating handle 32.

From the structure just described, it will be seen that by rotating handle 32 in a counter-clockwise direction, as viewed in Figs. 1 and 3, that the die block 11 will be forced by the actuating screw toward the stationary die block 10, and that by rotating handle 32 in the opposite direction, die block 11 may be moved away from die block 10.

To insure that the movable die block 11 will always be actuated to the same extent for each tooth swaged, it is necessary to provide a stop, and for that purpose a stop bracket 35, which is secured in block 2 by any suitable means, projects across the path of the operating handle 32. It is sometimes desirable to provide means for adjusting the stopping point of the actuating handle 32 and therefore stop bracket 35 is provided with a thumb-screw 36 positioned to be engaged by the operating handle. A lock-nut 37 may be provided to lock the thumb-screw 36 in adjusted position.

To insure that the die blocks 10 and 11 will be adjusted to the same angle, the cylindrical surface 38 of sleeves 16 and 24 may be graduated, as at 39, in degrees, or other suitable markings, and an "o" marker 40 placed at each side of block 2 adjacent the graduations 39 and set so that when the "o" graduation is opposite the "o" marker, the beveled shaping edges 13 and 14 of dies 10 and 11 will be in a vertical position. For convenience, in adjusting sleeves 16 and 24 the outer end portions thereof may be knurled as at 41.

It is necessary to govern the position of the tooth to be shaped with relation to the beveled shaping surfaces of the die blocks and for that purpose a tooth stop 42 projects into slot 4 between dies 10 and 11 and is secured to block 43 by screws 44. Block 43 is slidably mounted upon the top surface of block 2 and is clamped in position by means of screw 45.

The opening 46 in block 43, through which screw 45 passes, is elongated so that block 43 may be moved to adjust the tooth stop 42 to any desired position, and is then clamped in such position by tightening screw 45. A screw 47 is screw threaded through the rear end of block 43 and extends into the opening 46 and engages screw 45 as a further safeguard against block 43 and the tooth stop 42 being shifted from their adjusted positions. Screw 47 may also be used to assist in adjusting the tooth stop.

Centering screws 48 may be screw threaded through the opposite sides of block 2, adjacent the rear end of slot 4 to hold the shaping tool substantially central with respect to the saw blade, and also to prevent the rear end of the tool from shifting with relation to the saw blade.

In the operation of the invention, the angle at which the beveled shaping surface of the dies would first be adjusted by loosening the clamping screws 23 and 28 and rotating sleeves 16 and 24 to give the dies the required angle. Then the clamping screws would be tightened to clamp the dies in the adjusted position. As previously described, sleeves 16 and 24 have corresponding graduations 39 so that it is an easy matter to adjust each die to the required angle.

Next the operating handle stop screw 36 would be adjusted to stop further movement of the operating handle 32, when an unswaged portion of the saw blade 5 is clamped snugly between the shaping dies.

The tooth stop 42 should now be adjusted to properly position the tooth to be shaped between the beveled shaping surfaces of the dies. The position of the tooth stop for shaping planer teeth would be substantially as illustrated in Fig. 4, where it will be observed that should stop 42 be moved toward the left the swaged portion of the tooth will be reduced a greater and greater amount. It is possible to entirely flatten out the swage of the tooth by moving stop 42 until the swaged portion of the tooth would be held opposite the flat faces of the dies.

By moving the tooth stop 42 to the right, the cutting surface of the tooth will be wider so that by carefully adjusting the tooth stop the desired width of cutting or planing may be obtained.

The shaping tool is now ready to be operated: The saw blade to be shaped is securely held in any suitable form of saw vice, not shown, and the tool placed upon the top of the teeth to be shaped so that the saw blade extends through slot 4 of block 2. The operator firmly holds the tool by handles 3 and 32 and moves the tool backward until the tooth stop engages the face of a tooth to be shaped. The operator then rotates the operating handle 32 to the left until the handle engages the screw stop 32 and the handle 32 is then rotated to the right and the tool moved until the next tooth is engaged by the tooth stop, at which point the operation just described will be repeated. With a little practice the operator will be able to rapidly shape one tooth after another.

I claim:

1. A saw tooth swage shaping tool including the combination of a slotted block adapted to be mounted upon the saw blade to be shaped, a pair of opposed dies mounted in said block, means for angularly adjusting said dies with relation to said block and means for actuating one of said dies.

2. A saw tooth swage shaping tool including the combination of a slotted block adapted to be mounted upon the saw blade to be shaped, a pair of opposed dies mounted in said block, and each having parallel bevelled shaping surfaces, means for angularly adjusting said dies with relation to said block, and means for actuating one of said dies to shape the swaged portion of the tooth of said saw blade.

3. A saw tooth swage shaping tool including the combination of a block adapted to be mounted upon the blade to be shaped, a pair of opposed dies operatively mounted in said block, means for independently angularly adjusting each of said dies with relation to said block, means for actuating one of said die blocks to shape the swaged portion of the tooth of said saw blade, and an adjustable stop means for said actuating means.

4. A saw tooth swage shaping tool including the combination of a block adapted to be mounted upon the saw blade to be shaped, a pair of opposed dies mounted in said block and each having parallel beveled shaping surfaces, means for adjusting the working angle of said beveled shaping surfaces with relation to said block, and means for actuating one of said opposed dies to shape the swaged portion of the saw blade.

5. A saw tooth swage shaping tool including the combination of a block adapted to receive the saw blade to be shaped, a pair of opposed dies mounted in said block and each having parallel beveled shaping surfaces, means for adjusting the working angle of said beveled shaping surfaces with relation to said block, and means for actuating one of said opposed dies toward the other of said dies to shape the swaged portion of said saw blade.

6. A saw tooth swage shaping tool including the combination of a shaper block adapted to receive the saw blade and having an adjustable tooth stop for predetermining the position of said saw blade with reference to said block, a pair of opposed shaping dies operatively mounted in said block and each having parallel beveled shaping surfaces, means for adjusting the working angle of said beveled shaping surfaces with relation to said block, means for locking said angle adjusting means, and means for actuating one of said opposed dies toward the other of said dies to shape the swaged portion of said saw blade.

7. A saw tooth swage shaping tool including the combination of a shaper block adapted to receive the saw blade, a pair of opposed shaping dies operatively mounted in said block and each having a beveled shaping surface, means for adjusting the working angle of said beveled die shaping surfaces with relation to said block, means for locking said angle adjusting means, means adjustably mounted upon said shaper block for predetermining the position of the swaged portion of said saw blade with relation to said opposed shaping dies, and means for actuating one of said opposed shaping dies to shape and size the swaged portion of said saw blade.

Signed at Loyalton, California, this 24th day of February, 1931.

SAMUEL M. TAYLOR.